3,105,099
METHOD OF RENDERING ALCOHOLS ANHYDROUS

David Duerden, Simonstone, England, assignor to Abbott Laboratories, Chicago, Ill., a corporation of Illinois
No Drawing. Filed Sept. 1, 1959, Ser. No. 837,363
3 Claims. (Cl. 260—643)

This invention relates to a method of rendering alcohols anhydrous and more particularly, it relates to a method of rendering lower alkanols anhydrous by treatment with an alkali metal and sulfur dioxide or an alkali metal and an alkali metal metabisulfite.

It is well known that any alcohol employed in certain manufacturing processes such as the preparation of substituted malonic esters or barbituric acids must be relatively free of moisture. In both the alkylation of malonic esters and in the condensation of urea with malonic esters, it has been found that yields are substantially reduced when alcohol containing one percent or more water is employed.

Several methods are known for removing the final traces of water from alcohols such as methanol, ethanol, isopropanol, butanol and amyl alcohols. Briefly, these methods consist of (1) azeotropic distillation of the water-containing alcohol with benzene, (2) heating an alcoholic solution of sodium alkoxide in the presence of the appropriate dialkyl phthalate, (3) heating the aqueous alcohol with calcium or calcium oxide, and (4) dissolving magnesium in the alcohol to remove the water. However, these methods are time-consuming, cumbersome and uneconomical when used on a large scale.

It is one of the objects of the present invention to provide a simple and economical method for separating pure alcohol from a water-alcohol mixture.

Another object is to provide a method for separating anhydrous alcohol from mixtures of alcohol and water by treatment of said mixtures with sodium or potassium and subsequent treatment of the metal alkoxide with sulfur dioxide or with an alkali metal metabisulfite.

Another object is to provide a method of rendering alcohols anhydrous which can readily be adapted to continuous operation and which has few of the inherent disadvantages of the above-mentioned processes.

Other objects of the invention will become apparent from the specification and claims hereinafter set forth.

This new and improved method of rendering alcohols anhydrous comprises adding an alkali metal such as sodium or potassium to a water-alcohol mixture and after all the alkali metal is dissolved passing sulfur dioxide through the resulting solution. The reactions which take place are represented by the following equations wherein R represents a lower alkyl radical containing from 1 to 5 carbon atoms, inclusive, and M represents sodium or potassium:

$$2ROH + 2M \rightarrow 2ROM + H_2$$
$$ROM + HOH \rightleftharpoons ROH + MOH$$
$$ROM + MOH + SO_2 \rightarrow ROH + M_2SO_3$$

In practicing the method, at least two moles of the alkali metal per mole of water present in the alcohol is dissolved in the alcohol. Sulfur dioxide in an amount of at least one mole per mole of water present in the alcohol is then passed into the alkali metal alkoxide solution at temperatures up to the boiling temperature of the solution. The reaction mixture is then heated at the boiling temperature and under reflux to complete the reaction. If desired, the anhydrous alcohol is thereafter recovered from the reaction mixture by distillation.

The advantages of the method are as follows: (1) if the alcohol is distilled, an involatile, heat stable, low bulk residue of alkali metal sulfite remains, (2) the method can be applied successfully to any lower alkanol from methanol to amyl alcohol, inclusive, which obviates the holding of stocks of various phthalates, (3) the alkali metal sulfite produced as a by-product is sufficiently inert to permit many reactions to be carried out in its presence without interference, thus avoiding the necessity of actually distilling the dried alcohol before further use, (4) the cost of operating the method is much lower per pound of water removed than the prior art process using the respective phthalates which are not always available, and (5) the entire process can be performed in a relatively short period of time.

A still further advantage of the method of the present invention becomes manifest when compared with the prior art technique of dissolving sodium in an aqueous alcohol mixture followed by distillation to recover the anhydrous alcohol. Such a process is not an effective method of drying alcohols unless the sodium is present in huge excess. Thus, if alcohol containing 0.33% water is treated with 2.5 moles of sodium per mole of water, the product on distillation still contains as much as 0.22% water due to the equilibrium:

$$NaOR + HOH \rightleftharpoons NaOH + ROH$$

Apart from the cost of the very large excess of sodium, much alcohol remains in chemical combination as the alkoxide when the product is distilled.

If desired, an alkali metal metabisulfite of the formula $M_2S_2O_5$ wherein M represents sodium or potassium may be employed in the process in place of the sulfur dioxide. By employing the process of the present invention, lower alkanols containing as much as 5% water can be dehydrated to a water content of 0.045% or less.

The following examples illustrate the invention but are not to be considered as a limitation thereof.

Example 1

To 600 ml. of anhydrous methanol was added 6.0 ml. (0.33 mole) of water. Sodium metal, 19.2 grams (0.835 mole) was thereafter added and the resulting mixture heated at the boiling temperature and under reflux until all the sodium was dissolved. The heat was then removed and 26.7 grams (0.417 mole) of sulfur dioxide was passed into the reaction solution as rapidly as possible. Following the addition of the sulfur dioxide, the reaction solution was heated at the boiling temperature and under reflux for 45 minutes to complete the reaction. The anhydrous methanol was then recovered by distillation in a yield of 88% and was found to contain 0.0009% water by the Karl Fischer method of analysis.

Example 2

Sodium metal (15.5 grams) was dissolved in 500 ml. of ethyl alcohol containing 1% water. Sulfur dioxide (21.6 grams) was then gassed into the solution at 60° C. The reaction mixture was thereafter heated at the boiling temperature and under reflux for 90 minutes after which time the anhydrous ethanol was recovered by distillation. No moisture could be detected in the distilled ethanol by Karl Fischer analysis.

Example 3

Three ml. of water were added to 600 ml. of isoamyl alcohol and sodium metal (9.6 grams) dissolved therein by gentle refluxing of the mixture. Thereafter, 13.3 grams of sulfur dioxide was added rapidly and the reaction mixture refluxed for about 30 minutes. The dried isoamyl alcohol was recovered by distillation in a yield of 88% and upon analysis was found to contain 0.045% water.

Example 4

By following the procedure of Example 1, isopropyl alcohol containing 0.8% water was treated with potassium metal and sulfur dioxide to obtain substantially anhydrous isopropyl alcohol having a water content of 0.01%.

In the same manner as that set forth in the foregoing examples, other alcohols can be readily rendered anhydrous such as n-propyl alcohol, n-butyl alcohol, isobutyl alcohol, sec.-butyl alcohol, tert.-butyl alcohol, n-amyl alcohol, sec.-amyl alcohol and tert.-amyl alcohol. It will be obvious to one skilled in the art that sodium metabisulfite or potassium metabisulfite can be substituted for the sulfur dioxide employed in the examples illustrated above. Such substitution is considered to be equivalent so far as the practice of the present invention is concerned.

According to the provisions of the patent statutes, I have explained the principle and mode of practicing my invention and have described what I now consider to represent its best embodiment. However, I desire to have it understood that within the scope of the appended claims, the invention may be practiced otherwise than as specifically described.

I claim:

1. That method of rendering a water-lower alkanol mixture, the alkanol containing from 1 to 5 carbon atoms inclusive, anhydrous which comprises the steps of
   (a) dissolving in said water-alkanol mixture at least two moles of an alkali metal selected from the group consisting of sodium and potassium per mole of water present in said mixture,
   (b) contacting the resulting solution at a temperature of about 60° C. with at least one mole of a member of the group consisting of gaseous sulfur dioxide, sodium metabisulfite and potassium metabisulfite per mole of water present in said solution, and
   (c) refluxing the reaction mixture for a period of from 30 to 90 minutes until the precipitation of the alkali metal sulfite is complete and the alkanol is substantially anhydrous.

2. A method as claimed in claim 1 in which the alkali metal employed is sodium.

3. A method as claimed in claim 1 in which the alkali metal employed is potassium.

References Cited in the file of this patent

UNITED STATES PATENTS

| | | |
|---|---|---|
| 2,121,954 | Cunningham | June 28, 1938 |

FOREIGN PATENTS

| | | |
|---|---|---|
| 366,025 | Great Britain | Jan. 27, 1932 |
| 437,210 | Great Britain | Oct. 25, 1935 |

OTHER REFERENCES

Handbook of Chemistry and Physics (37th ed.), pp. 600–601 (1955–1956). (Copy in Division 38.)